(12) United States Patent
Gannon et al.

(10) Patent No.: US 12,661,776 B2
(45) Date of Patent: Jun. 23, 2026

(54) TELESCOPIC GRABBER DEVICE

(71) Applicants: Dani E. Gannon, Newark, DE (US);
Joshua Zapata, Garfield, NJ (US)

(72) Inventors: Dani E. Gannon, Newark, DE (US);
Joshua Zapata, Garfield, NJ (US)

( * ) Notice: Subject to any disclaimer, the term of this
patent is extended or adjusted under 35
U.S.C. 154(b) by 945 days.

(21) Appl. No.: 17/743,311

(22) Filed: May 12, 2022

(65) Prior Publication Data

US 2022/0362926 A1     Nov. 17, 2022

Related U.S. Application Data

(60) Provisional application No. 63/187,526, filed on May
12, 2021.

(51) Int. Cl.
| | |
|---|---|
| *B25J 1/04* | (2006.01) |
| *B25G 1/04* | (2006.01) |
| *E01H 1/12* | (2006.01) |

(52) U.S. Cl.
CPC .................. *B25J 1/04* (2013.01); *B25G 1/04*
(2013.01); *E01H 1/12* (2013.01); *E01H*
*2001/1293* (2013.01)

(58) Field of Classification Search
CPC ............. B25J 1/04; B25J 15/08; B25J 18/025
See application file for complete search history.

(56) References Cited

U.S. PATENT DOCUMENTS

| | | | | | |
|---|---|---|---|---|---|
| 1,277,778 | A | * | 9/1918 | Tichacek | B25J 1/04 |
| | | | | | 294/22 |
| 2,613,100 | A | * | 10/1952 | Casey, Jr. | B25J 1/04 |
| | | | | | 294/115 |
| 3,146,015 | A | * | 8/1964 | Roberge | B25J 1/04 |
| | | | | | 294/104 |
| 3,591,226 | A | | 7/1971 | Elmore, Jr. | |
| 3,972,552 | A | * | 8/1976 | Earp, Jr. | B25J 1/04 |
| | | | | | 294/112 |
| 4,160,563 | A | * | 7/1979 | Whitney | B25J 1/04 |
| | | | | | 294/104 |
| 4,359,240 | A | * | 11/1982 | Woeber | B25J 1/04 |
| | | | | | 294/115 |
| 4,615,555 | A | * | 10/1986 | Bateham | B25J 1/04 |
| | | | | | 294/104 |
| 4,629,234 | A | * | 12/1986 | Sokolowski | B25J 1/04 |
| | | | | | 294/111 |
| 5,324,086 | A | | 6/1994 | Hammer | |
| 5,613,721 | A | | 3/1997 | Mullins | |
| 5,618,075 | A | | 4/1997 | Baziuk | |
| 5,628,538 | A | | 5/1997 | Ericksen | |

(Continued)

*Primary Examiner* — Thomas E Lazo
(74) *Attorney, Agent, or Firm* — Anthony Santangelo;
Peter D. Miyner

(57) ABSTRACT

A collapsible grabber device, comprises a telescoping pole;
a jaw assembly at the distal end of the pole comprising two
jaws movably coupled by a pivot for releasably gripping an
object in a closed position, a handle at the proximal end
configured to house the telescoping pole and the jaw assem-
bly in the collapsed state; a lever on handle for controlling
the jaw assembly; a spring within the jaw assembly for
biasing the jaws in either an open position or a closed
position; and a cable coupling the jaw assembly and the
lever. Advantages of the grabber include compactness, con-
cealability, higher usage rates, collapsibility/extendibility,
ruggedness, precision and attractiveness.

6 Claims, 10 Drawing Sheets

(56)  References Cited

U.S. PATENT DOCUMENTS

| | | | | |
|---|---|---|---|---|
| 5,823,590 | A * | 10/1998 | Forrest | B25J 1/04 |
| | | | | 294/24 |
| 6,361,094 | B1 | 3/2002 | Pelley | |
| 6,520,556 | B1 * | 2/2003 | Hsu | B25J 1/04 |
| | | | | 294/115 |
| 8,641,110 | B1 | 2/2014 | Perry | |
| 9,486,915 | B2 * | 11/2016 | Buzby | B25B 9/00 |
| 9,878,444 | B1 * | 1/2018 | Harrington | A47F 13/06 |
| D854,901 | S | 7/2019 | Orikawa | |
| 10,500,715 | B1 | 12/2019 | Fleming | |
| D876,191 | S | 2/2020 | Orikawa | |
| 10,625,413 | B1 * | 4/2020 | McPherson | B25J 15/0213 |
| 2005/0023849 | A1 * | 2/2005 | Ganter | B25B 7/12 |
| | | | | 294/105 |
| 2009/0121505 | A1 * | 5/2009 | Shatilla | B25J 1/04 |
| | | | | 320/114 |
| 2009/0309378 | A1 | 12/2009 | Kroeze | |
| 2010/0281642 | A1 * | 11/2010 | Lee | B25G 3/06 |
| | | | | 16/404 |
| 2015/0158183 | A1 * | 6/2015 | Mcnay | B25J 1/04 |
| | | | | 74/491 |
| 2015/0183115 | A1 * | 7/2015 | Pe | B25J 1/04 |
| | | | | 294/106 |
| 2015/0216272 | A1 * | 8/2015 | Paybins | A45B 3/04 |
| | | | | 294/198 |

* cited by examiner

TELESCOPIC GRABBER DEVICE

CROSS-REFERENCE TO RELATED APPLICATIONS

This application is related to and claims priority to U.S. Provisional Patent Application No. 63/187,526, filed on 12 May 2021. The provisional application is incorporated by reference herein in its entirety.

FIELD OF THE INVENTION

The present invention is directed to telescopic devices, and more specifically, to devices comprising a jaw assembly for picking up small items by a user.

DESCRIPTION OF RELATED TECHNOLOGY

A foldable reacher grabber tool is taught in U.S. Pat. No. 10,500,715. An object-picking tool for picking objects from a distance includes an elongated arm and a gripping device. The elongated arm includes a distal arm and a proximal arm. Further the gripping device is provided at a distal end of the distal arm. The object-picking tool also includes a handle present on a proximal end of the proximal arm. Further, a controlling device is present on handle for controlling the gripping device. The object-picking tool further includes a folding and locking device having a button. The button, when pushed inside locks the distal arm and the proximal arm. The button when pushed back again or release unlock the distal arm and the proximal arm for folding.

A multi-purpose reacher-grabber tool is disclosed in U.S. Pat. No. 8,641,110. A tool with two interconnected appendages extending in two different directions from an end of an interchangeable extension pole. The first appendage may be oriented along a plane substantially parallel to the pole axis. The second appendage may be oriented along a plane substantially normal to the axis. An open-ended slot may be provided in each appendage for grabbing cords and other items. At least one of the open-ended slots may graduate from a larger width at an open end of the slot to a reduced width toward a closed end of the slot. Pull-chains to be operated can be inserted and locked into the smaller portion of the slot. Stop surfaces may be provided that limit insertion of an appendage to a specific distance, for example to operate a louver of a window shutter. Internal Acme threads may be provided in the tool to attach it to existing poles.

A grasping device is shown in U.S. Patent No. D 776,999.

A grabber tool is shown in U.S. Patent No. D854,901. A grabber tool is shown in U.S. Patent No. D876,191.

Adjustable length grabber is taught in U.S. Pat. No. 5,823,590. An adjustable length pole has an attachment with at least two fingers which are moveable to provide gripping force. In one embodiment, the fingers are opposed digits which are moveable toward each other to a closed position. The fingers are hinged, and at least one of the fingers is attached to a cord which is operable to move an end of the finger toward an end of the other finger. In a further embodiment, a spring is provided to bias the fingers in an open position. The cord is threaded through the middle of the telescoping pole to help prevent it from becoming tangled in tree branches. Further, a portion of the cord comprises a spring mechanism such as an elastic material to enable a user to set a desired tension for the fingers. Hooks are provided on the telescoping pole to secure the cord and allow two handed manipulation of the pole while the fingers retain desired tension on an object to be moved.

A telescopic device having multifunctional attachments is disclosed in U.S. Patent Publication No. 2010/0281642. A representative telescopic device includes a housing, a telescopic stick, and an attachment system. The telescopic stick is configured to be housed in the housing in a closed position. The telescopic stick includes one or more segments that is configured to extend into an elongated stick in an extended position. The attachment system is attached to an end of the telescopic stick. The attachment system includes a locking mechanism that locks and unlocks an attachment to the telescopic stick. The attachment system further includes an attachment actuation mechanism that opens and closes the attachment.

An adjustable gripping device is disclosed in U.S. Patent Publication No. 2009/0309378. A gripping assembly having a first or holding end with a pair of rotatable operating elements held therein and connected to a wind assembly having a flexible, non-resilient link held by one end therein for operating a pair of gripping elements, movably mounted on a distal end of an adjustable, two part hollow body. The wind assembly is captured between a pair of lever housings and includes a constant force spring to allow the flexible, non-resilient link to be wound onto or from the wind assembly.

An extensible wading staff with retractable hook is taught in U.S. Pat. No. 5,628,538. The invented extensible wading staff includes an elongate shaft with first and second ends, a gripping area, a retractable hook near the first end, and a foot structure such as a rubber cap on the sealed end. A fisherman who is in water, especially moving water, may use the wading staff to maintain his balance while he is flyfishing. In addition, a fisherman may use the staff to help him retrieve snagged fishing devices such as flies, lures, lines and hooks from overhanging tree branches or underwater obstacles.

An object retrieval apparatus is disclosed in U.S. Pat. No. 6,361,094. An object retrieval apparatus including a base plate having an opening disposed therethrough at a predetermined location. At least two jaws are pivotally attached to the base plate. An actuator is movably disposed through the opening in the base plate and is fixedly attached to a retention member. At least two pivot arms are pivotally attached to the retention member and the jaws. Finally, a closing means is provided for closing the jaws. In operation, the actuator is positioned such that the jaws are in open position. The actuator is then caused to contact the object to be retrieved, or a surface proximate to the object, such that the retention member and the pivot arms are moved towards the base plate, causing the jaws to pivot inward. Once the actuator is moved past a trigger point, the closing means is engaged and acts to drives the jaws inward. This inward movement causes the retention member and actuator to move toward the base plate such that a space is created between the actuator and the closed jaws for accommodating the object to be retrieved.

A pick up tool and jaw apparatus therefor is taught in U.S. Pat. No. 4,615,555. A pick up device having a shank with a handle on one end and a jaw assembly on the other. The jaw assembly includes a fixed jaw and a movable jaw, the movable jaw having a pair of jaw operating arms that can be moved to open and close the jaw member. A spring is connected to one jaw operating arm and a link is connected to the other jaw operating arm, and the two are interchangeable so the jaw can be normally open or normally closed. The link is operated from the handle. In one form of the invention, the shank can telescope, and the operating is through a cable that can be extended.

A retrieving aid is disclosed in U.S. Pat. No. 5,613,721. An apparatus for raising, lowering, or retrieving an article, such as an arrow or an article of clothing, to or from an elevated position relative to the ground, such as a tree stand, includes a foldable hook assembly connected with a cord. The foldable hook assembly includes a pair of spaced generally parallel body members defining a space therebetween adapted to receive an arrow, spacers arranged between the body members, and a pair of fork arms pivotally connected with the body members. The fork arms are provided with angled surfaces which facilitate engagement of the item and allow the apparatus to slide along the ground. The ends of the fork arms are provided with barbs which allow soft articles, such as articles of clothing, to be engaged.

Gripping device for handicapped person is taught in U.S. Pat. No. 3,591,226. This gripping device has an elongated tube with a handle at one end and a shoehorn at the other end. A pivotable arm is located near the shoehorn and is operated by a cable which extends through the tube and terminates at the handle. The arm cooperates with the shoehorn in gripping a shoe. The arm can be spring biased to open or closed position with respect to the shoehorn. When in closed position the arm and shoehorn can grip an article therebetween.

A pick-up tool is disclosed in U.S. Pat. No. 4,160,563. A pick-up tool comprising an elongated hollow shank having a fixed jaw at one end, a pivoting jaw opposite the fixed jaw, a handle transverse to the shank, a trigger adjacent the handle and moveably mounted thereon, a connection member attached to the moveable jaw and to the trigger, and a spring urging the moveable jaw into an open position. The moveable jaw closes into a notch in the forward end of the fixed jaw. A major portion of the length of the moveable jaw is closely adjacent to the fixed jaw when the jaws are in a position of being closed to the maximum. The connection member is flexible and has a slacking section urged toward a slack position by a spring secured to the ends of the slacking section, the connection member being drawn taut by a sufficient movement of the trigger.

A device capable of positive extension and retraction using a cascading force transfer is taught in U.S. Pat. No. 5,324,086. An extendible-retractable device, which is made up of a number of interconnected members and to which a suitable tool may be attached. The device makes it possible to continually change the position of the tool as a task is being performed. The device includes members which are attached to each other through flexible cables so that relatively small movements of a handle or similar device in the hand of the user results is relatively large extension or retraction movements of the farthest member which carries the tool.

A manual grasping and lifting device for stones and the like is disclosed in U.S. Pat. No. 5,618,075. A grabber for lifting particularly stones from the bottom of a manhole comprises a elongate handle with a lifthead at the bottom of a handle. The lifthead carries a pair of levers each pivoted to an outside corner of the lifthead and each carrying a grasping member hanging downwardly from the lift lever. The grasping member has three fingers which are inclined downwardly and outwardly and then downwardly and inwardly with a center finger having an end point further out than two side fingers. The side fingers incline outwardly and downwardly. A cable extending through the hollow handle wraps around pulleys on the lift levers so that upward pulling force on cable pulls the levers inwardly and grasps the stone.

Although there are many reacher grabbers on the market, significant hurdles remain. There is a need for reacher grabber that is more compact, is concealable, is more likely to be used, is collapsible and extendable, is rugged, is precise in its function, and is aesthetically acceptable by the marketplace.

SUMMARY OF THE INVENTION

The present invention is directed to a collapsible grabber device, comprising: a telescoping pole comprising a proximal end and a distal end; a jaw assembly at the distal end comprising two jaws movably coupled by a pivot for releasably gripping an object in a closed position, a handle at the proximal end configured to house the telescoping pole and the jaw assembly in the collapsed state; a lever on handle for controlling the jaw assembly; a spring within the jaw assembly for biasing the jaws in either an open position or a closed position; and a cable coupling the jaw assembly and the lever.

The collapsible grabber device of the present invention incorporates many features not found in grabber devices on the market. The grabber device of the present invention has been designed to be an improvement over others in the market in several areas. Examples of these improvements include a more compact design, concealability, higher user satisfaction, collapsibility/extendibility; ruggedness, preciseness, and attractiveness. Under one embodiment, the grabber device of the present invention is "Expand 'n' Grab".

The grabber device is suitable to reach objects that are stored on high shelves, or are otherwise hard to reach, such as a jar on a top shelf in a supermarket. This device is useful to persons of small stature or who were otherwise not very flexible or were movement limited. This device is suitable to retrieve low items to assist the user by reducing the number of times the user has to bend over or the distance that the user needs to bend.

One of the advantages of the device of the present invention is the small size that the device collapses to when not in use. The device of the present invention is suitable to be carried in a purse. Under one embodiment, the device of the present invention fits into a purse of an average size.

The grabber of this invention is extremely compact and is collapsible into a small shape of around six inches or less. This makes it one the smallest grabber available in its compressed form.

As exemplified in FIG. 1 to FIG. 5, the grabber device 10 comprises telescoping pole 40. The telescoping pole 40 includes a plurality of hollow pole sections. In FIG. 1 to FIG. 5, three hollow pole sections are shown: the proximal pole section 41, medial pole section 42, and distal pole section 43.

Under one embodiment, the pole sections have a rectangular profile wherein at least some of the corners are rounded. This shape aids in the strength of the telescoping pole and the collapsible grabber device and increases the force that is able to be applied to the device in use. The pole sections with a rectangular profile appear to withstand torsional forces on the jaw assembly.

Under one embodiment, the pole sections comprise one or more push buttons 44 and 45 which extend through a hole in the tube to hold the tubes locked in their extended position.

The jaw assembly 60 is attached to the distal end of the telescoping pole. The jaw assembly 60 is attached to the distal end of the distal tube. The jaw assembly 60 contains a pair of jaws 61 which pinch together like a person's thumb and index finger to grasp objects when the lever 23 is depressed. FIG. 1 shows the jaws closed, and FIG. 2 shows the jaws open.

The handle 20 is configured so that the joining of the handle top side 21 and handle bottom side 22 during the manufacturing of the device forms a storage space sufficient to house the telescoping pole 40 and the jaw assembly 60 in the collapsed state.

The cable 80 couples a part of the jaw assembly 60 to the lever on the handle 24. When the lever is depressed, the cable is placed under tension, pulling a part of the jaw assembly partially into distal pole section. Under one embodiment, the effect of pulling a part of the jaw assembly partially into distal pole section results in the jaws opening up. Under another embodiment, the effect of pulling a part of the jaw assembly partially into distal pole section results in the jaws closing.

The handle manufactured by the assembly of handle top side 21 to handle bottom side 22 further comprises the space for lever 23 to operate throughout its range of motion. Upon depressing the lever 23, the lever pivots around lever pivot 26, pushing against the cable thus actuating the jaws.

The device of the invention is taken from its storage, such as a pocket, purse or closet. Under one embodiment, the telescoping pole lock switch 25 is depressed, the nested pole sections are pulled out of the handle. The nested telescopic pole sections 41, 42 and 43 are extended until the push buttons 44 and 45 engage with their respective holes in the proximal and medial telescopic pole sections 41 and 42 and locks in its fully extended position.

BRIEF DESCRIPTION OF THE DRAWINGS

These and other features and advantages of the various embodiments disclosed herein will be better understood with respect to the following description and drawings. The exemplary embodiments of the invention as illustrated in the drawings and further explained hereinunder.

DETAILED DESCRIPTION OF THE INVENTION

Figure 1:
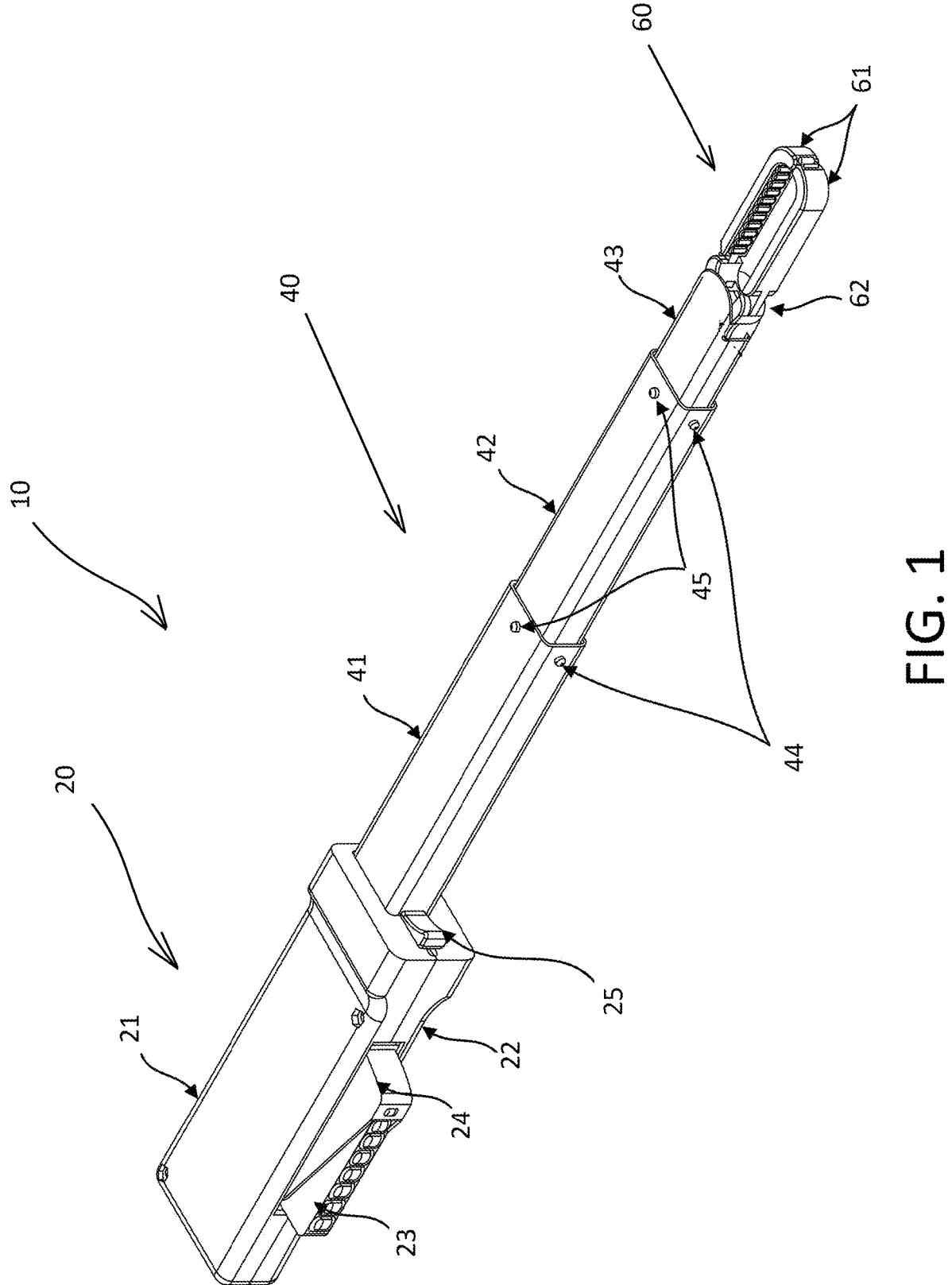
FIG. 1 is a perspective view of an exemplary embodiment of the device of the present invention in the extended state with jaws closed.

The present invention, in part, is directed to a collapsible grabber device, comprising a telescoping pole, a jaw assembly at one end of the telescoping pole, a handle at the other side of the telescoping pole, a lever on handle for opening up the jaw assembly connected to the jaw assembly by a cable.

For illustrative purposes, the principles of the present invention are described by, referencing various exemplary embodiments thereof. Although particular embodiments of the invention are specifically described herein, one of ordinary skill in the art will readily recognize that the same principles are equally applicable to and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

All references cited herein are hereby incorporated by reference in their entireties. In the event of a conflict in a definition in the present disclosure and that of a cited reference, the present disclosure controls.

Any member in a list of species that are used to exemplify or define a genus may be mutually different from, or overlapping with, or a subset of, or equivalent to, or nearly the same as, or identical to, any other member of the list of species. Further, unless explicitly stated, the list of species that define or exemplify the genus is open, and it is given that other species may exist that define or exemplify the genus just as well as, or better than, any other species listed.

As used herein and in the appended claims, the singular forms "a", "an", and "the" include plural references unless the context clearly dictates otherwise. The terms "a" (or "an"), "one or more" and "at least one" may be used interchangeably herein. The terms "comprising", "including", and "having" may be used interchangeably.

The abbreviations and symbols as used herein, unless indicated otherwise, take their ordinary meaning.

The terms "closed" and "open" refer to the state of the jaws on the present device. The terms "extended" and "collapsed" refer to the state of the telescoping pole.

The term "push button" under one embodiment, may be referred to as a locking pin or a spring button lock.

The present invention is directed to a collapsible grabber device, comprising: a telescoping pole comprising a proximal end and a distal end; a jaw assembly at the distal end comprising two jaws movably coupled by a pivot for releasably gripping an object in a closed position, a handle at the proximal end configured to house the telescoping pole and the jaw assembly in the collapsed state; a lever on handle for controlling the jaw assembly; a spring within the jaw assembly for biasing the jaws in either an open position or a closed position; and a cable coupling the jaw assembly and the lever.

The collapsible grabber device of the present invention incorporates many features not found in grabber devices on the market. The grabber device of the present invention has been designed to be an improvement over others in the market in several areas. Examples of these improvements include a more compact design, concealability, higher user satisfaction, collapsibility/extendibility, ruggedness, preciseness, and attractiveness. Under one embodiment, the grabber device of the present invention is "Expand 'n' Grab".

The grabber device of the present invention is suitable for many situations. The grabber device is suitable to reach objects that are stored on high shelves, or are otherwise hard to reach, such as a jar on a top shelf in a supermarket. This device is useful to persons of small stature or who were otherwise not very flexible or were movement limited. This device is suitable to retrieve low items to assist the user by reducing the number of times the user has to bend over or the distance that the user needs to bend. This device is handy in this regard for retrieving fallen items and picking items at a low level, like, perhaps on the bottom shelf of a supermarket.

This ability to pick up low items is also useful for picking up trash or debris and gives the additional advantage that the user does not have to touch the trash or debris with user's hands. Distasteful items to pick up like trash, syringes in the park, or dog waste may be picked up with the device of the present invention.

Additionally, the device of the present invention is suitable to be used by an elderly or infirm person to aid in dressing and changing the person. Examples of such uses includes putting on socks, pulling up pants or underwear. The device of the present invention greatly adding to the person's independence and ability to care for self.

One of the advantages of the device of the present invention is the small size that the device collapses to when not in use. The device of the present invention is suitable to be carried in a purse. Under one embodiment, the device of the present invention fits into a purse of an average size.

Under one embodiment, the device collapses to the length of less than about 25 cm (about 10 inches). Under one embodiment, the device collapses to the length of less than about 20 cm (about 8 inches). Under one embodiment, the device collapses to the length of less than about 15 cm (about 6 inches).

The device of the present invention is light enough to be carried in a purse or a coat pocket. Under one embodiment, the device weighs less than 400 g. Under one embodiment, the device weighs less than 300 g. Under one embodiment, the device weighs less than 200 g. Under one embodiment, the device weighs between 150 and 200 g.

Under one embodiment, the device of this invention collapses to around six inches in length and weighing only six ounces. The device of this invention is designed to be able to do precise and discreet retrievals. The device is suitable to be carried and used in social situations discreetly without drawing embarrassing attention to oneself. The device of the present invention solves embarrassing situations. One example of an embarrassing situation that the use of the device would avoid is when an infirm person drops a cane, perhaps at a bus stop or restaurant, and does not want to call attention to self by asking for help. The precise action of this invention allows the user to grasp even thin cylindrical objects like the cane a blind person uses or car keys or even an eating utensil where other devices would struggle and cause more embarrassment.

The device of the present invention lends itself to being concealed in plain sight. More portable than a small umbrella, this device is suitable to be kept on the person perhaps with a lanyard attached through a lanyard loop 27 around the user's wrist to be ready immediately for use in any situation that might come up. One such application might be for an elderly person using a pool or gym. This device could discreetly be carried and used to put on and then pull off a wet bathing suit for example. Other similar devices could be used but they lack the feature of concealability which greatly aids discretion and avoids embarrassment. This feature would also make it much more likely to be used and then the user would rely on it because it would be on their person.

The grabber of this invention is extremely compact and is collapsible into a small shape of around six inches or less. This makes it the smallest grabber available in its compressed form. This small size makes it much more portable and usable in many more situations than other grabbers. If carried on your person it could help out in many situations to avoid embarrassment and inconvenience.

The invention can be made to be extendible to any practical length. Under one embodiment, the extended length is about 50 cm. Under one embodiment, the extended length is about 40 to about 50 cm, Under one embodiment, the extended length is about 50 to about 60 cm. Under one embodiment, the extended length is about 60 to about 75 cm.

This small compact size also lends the grabber of the invention to be shaped in a more attractive, appealing manner than other grabbers on the market. An attractive and appealing shape will add to its discrete use or increase the enjoyment of the user by it perhaps being a playful or whimsical design. The shape of the handle can be made to approximate other typically carried items like cosmetics or other items. Under one embodiment, the device of the invention is shaped like the tool or weapon of the user's favorite movie hero like a laser sword.

Under one embodiment, the device of the invention is made of or painted with fluorescent or bright colors, such as fluorescent green. Painting the handle in such colors makes the grabber easy to locate in a bag and is reflective at night. Under one embodiment, the surface of the handle displays advertising materials.

The present invention is directed to a collapsible grabber device, comprising: a telescoping pole, a jaw assembly, a handle, a lever, a spring, and a cable.

As exemplified in FIG. 1 to FIG. 5, the grabber device 10 comprises telescoping pole 40. The telescoping pole 40 includes a plurality of hollow pole sections. In FIG. 1 to FIG. 5, three hollow pole sections are shown: the proximal pole section 41, medial pole section 42, and distal pole section 43.

The pole sections are constructed out of aluminum in this embodiment because it is lightweight, strong, rigid and will not rust. However, the pole sections may be constructed out of any rigid material such as metal, wood or plastic.

The diameter or the dimensions of each of the pole sections are selected so that the extension and collapse of the telescopic pole is easy for the user to effectuate such action. In the collapsed state, the distal pole section 43 slides into medial pole section 42, which in turn slides into proximal pole section 41, which in turn slides into the handle 20.

Under one embodiment, the pole sections have a circular profile. Under one embodiment, the pole sections have a square profile. Under one embodiment, the pole sections have a rectangular profile. Under one embodiment, the pole sections have a square profile wherein at least some of the corners are rounded or truncated. Under one embodiment, the pole sections have a rectangular profile wherein at least some of the corners are rounded or truncated.

Under one embodiment, the pole sections have a rectangular profile wherein at least some of the corners are rounded. This shape aids in the strength of the telescoping pole and the collapsible grabber device and increases the force that is able to be applied to the device in use. The pole sections with a rectangular profile appear to withstand torsional forces on the jaw assembly.

Under one embodiment, the pole sections are held in place in the extended state by friction, wherein no locking system is necessary.

Under one embodiment, the pole sections are adjustably coupled together by combinations of threaded ring and split washer combinations. The threaded ring and split washer combinations are of common design, heavy-duty plastic, and permit the pole sections to be adjusted between being fully extended and telescoped to a short length in a well-known manner.

Under one embodiment, the pole sections comprise one or more push buttons 44 and 45 which extend through a hole in the tube to hold the tubes locked in their extended position. These buttons may be placed on the longer side of the rectangular cross section, such as 45, or the shorter side of the rectangular cross section, such as 44. The buttons are sprung so that they will push through a corresponding hole in the next larger sized tube to effectuate locking the device in an extended position.

The present invention is directed to a collapsible grabber device, comprising: a telescoping pole, a jaw assembly at the distal end comprising two jaws movably coupled by a pivot for releasably gripping an object in a closed position, a handle, a lever, a spring, and a cable.

Figure 2:
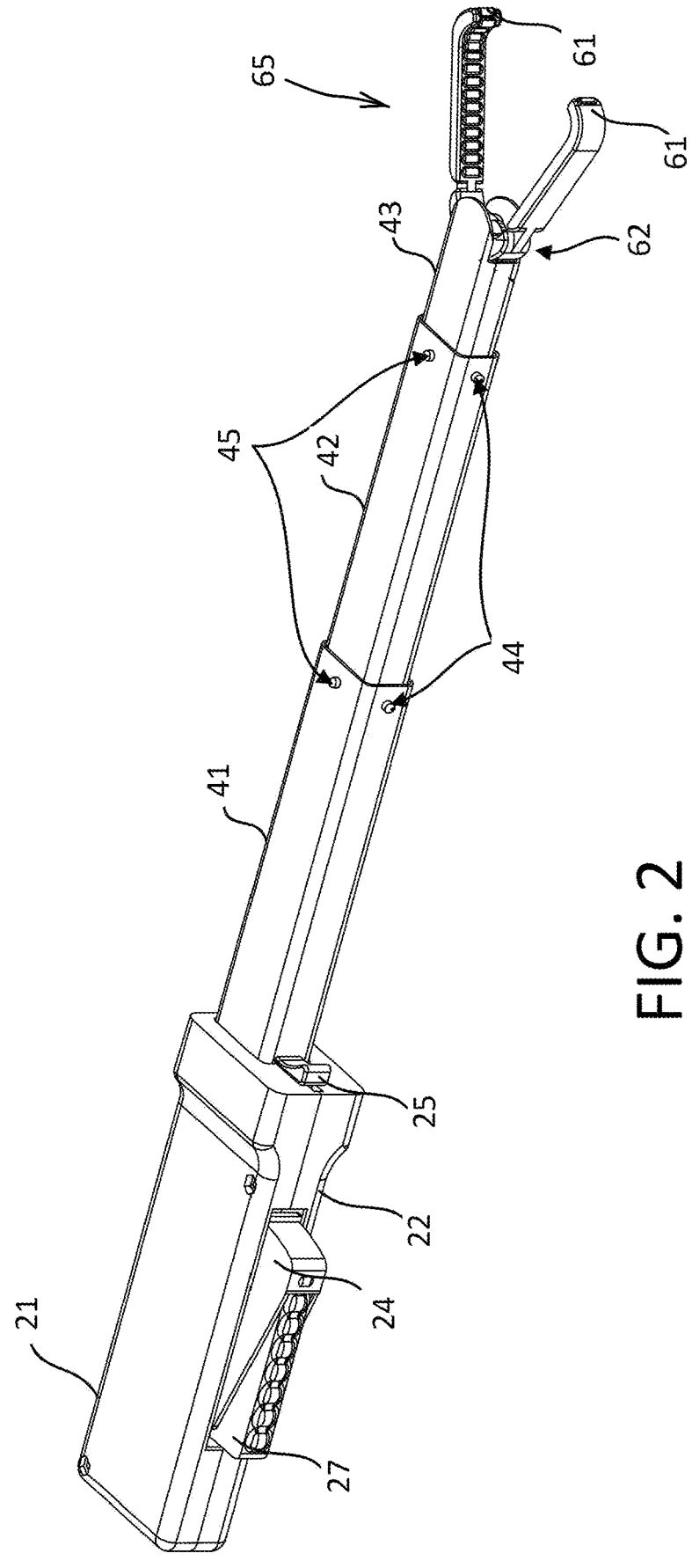
FIG. 2 is a perspective view of an exemplary embodiment of the device of the present invention in the extended state with jaws open.
Figure 3:
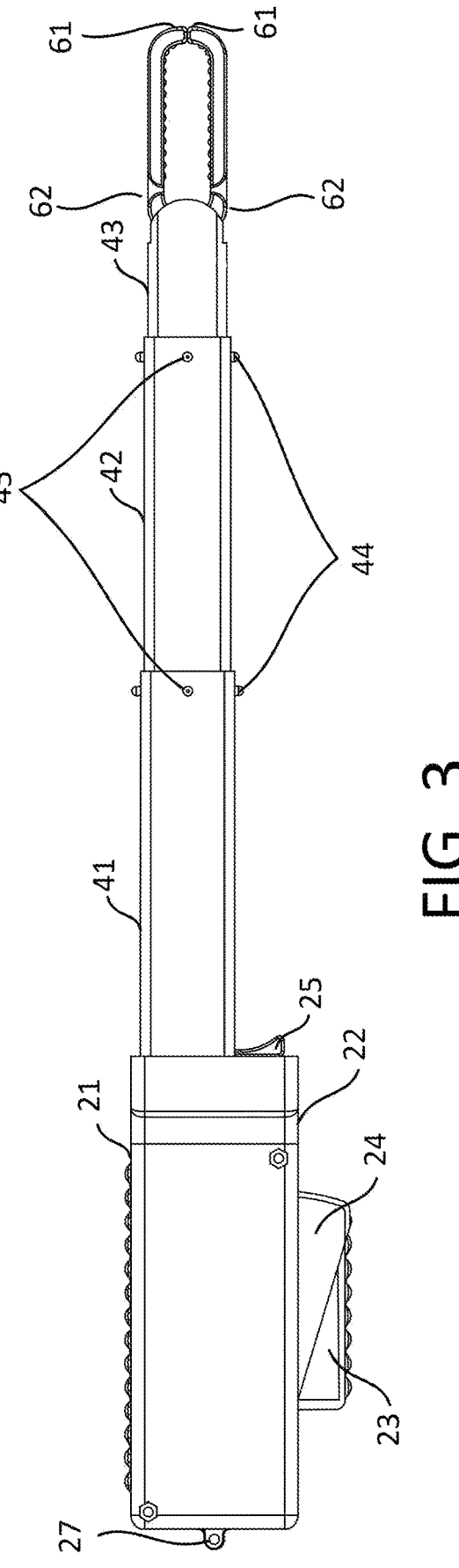
FIG. 3 is a top plan view of an exemplary embodiment of the device of the present invention in the extended state with jaws closed.

The jaw assembly 60 is attached to the distal end of the telescoping pole. The jaw assembly 60 is attached to the distal end of the distal tube. The jaw assembly 60 contains a pair of jaws 61 which pinch together like a person's thumb and index finger to grasp objects when the lever 23 is depressed. FIG. 1 shows the jaws closed, and FIG. 2 shows the jaws open.

The pair of jaws 61 may have a spring to open or close the jaws upon release from the handle 20. Each of the two jaws 61 are retained and pivot around a jaw pivot pins 62. Further; a jaw central pin 63 connects the two jaw arms 64. A jaw arm 64 is an extension which aids in the movement of the jaws when the cable is pulled.

The present invention is directed to a collapsible grabber device; comprising: a telescoping pole, a jaw assembly; a handle at the proximal end configured to house the telescoping pole and the jaw assembly in the collapsed state; a lever, a spring, and a cable.

In the extended state, the handle 20 is at the proximal end of the telescoping pole. Specifically, in the extended state, the handle 20 is at the proximal end of the proximal pole section.

The handle 20 is formed by any means known in the art. Under one embodiment, the handle 20 is formed as two halves of handle top side 21 and handle bottom side 22. These handle sides 21 and 22 are formed from any suitable material, including rigid plastic, hard plastic, metal, wood, or a mixture thereof. The handle top side 21 and the handle bottom side 22 are attached to each other by any suitable means, including fusing, gluing, screwing, or snapping.

The handle 20 is configured so that the joining of the handle top side 21 and handle bottom side 22 during the manufacturing of the device forms a storage space sufficient to house the telescoping pole 40 and the jaw assembly 60 in the collapsed state.

This storage space will further comprise a means to effectuate the containment and sliding in and out of the pole sections 41, 42, and 43, by virtue of the shape of the opening to accommodate the telescopic pole. Although the example pictured in FIGS. 1 to 10 contain three pole sections, there may be any plurality of pole sections. Each pole section further comprises features known in the art such as a lip or flare to keep the proximal ends of the pole sections being retained in the distal ends the next larger tube or the handle.

The storage space will be close fitting to proximal pole section 41 to allow the device when extended to be firm and solid and yet designed for the ease of proximal pole section 41 to slide in and out of the storage space. Under one embodiment, the extension and the collapse of the telescoping pole may be reduced by adjusting the gap between the pole sections, or by introducing friction control components.

The handle 20 also comprises the telescoping pole lock switch 25. The handle top side 21 and handle bottom side, when combined to form a handle, also comprise the means for the proximal pole section 41 to slide up and down to effectuate the release and containment of the collapsed pole section. The proximal pole section 41 slides within and is contained by the cavity in the handle that holds the proximal pole section in place but allows it to slide in and out. When the lock switch 25 is switched, the telescoping arm and the jaw assembly are locked within the handle 20. The telescoping pole lock switch 25 is manually set to the opposite range of motion to the open position to release the telescoping pole.

The present invention is directed to a collapsible grabber device, comprising: a telescoping pole, a jaw assembly, a handle, a lever, a spring within the jaw assembly for biasing the jaws in either an open position or a closed position, and a cable.

Under one embodiment, the spring 70 is a compression spring. Under one embodiment, the spring 70 is an extension spring. An extension spring becomes longer under a load, whereas a compression spring becomes shorter.

Under one embodiment, the spring biases the jaws to be open. This means that the relaxed state of the grabber with extended telescopic pole has jaws open. When the lever 23 is pressed, the jaws close. An example is shown in FIG. 2.

Under one embodiment, the spring biases the jaw to be closed. This means that the relaxed state of the grabber with extended telescopic pole has jaws closed. When the lever 23 is pressed, the jaws close. An example is shown in FIGS. 1, 3, 4, and 5.

The spring is located within the jaw assembly, in a manner so that the jaws are biased either to be open or closed.

Under one embodiment, the spring is a compression spring coupling two jaws.

Figure 4:
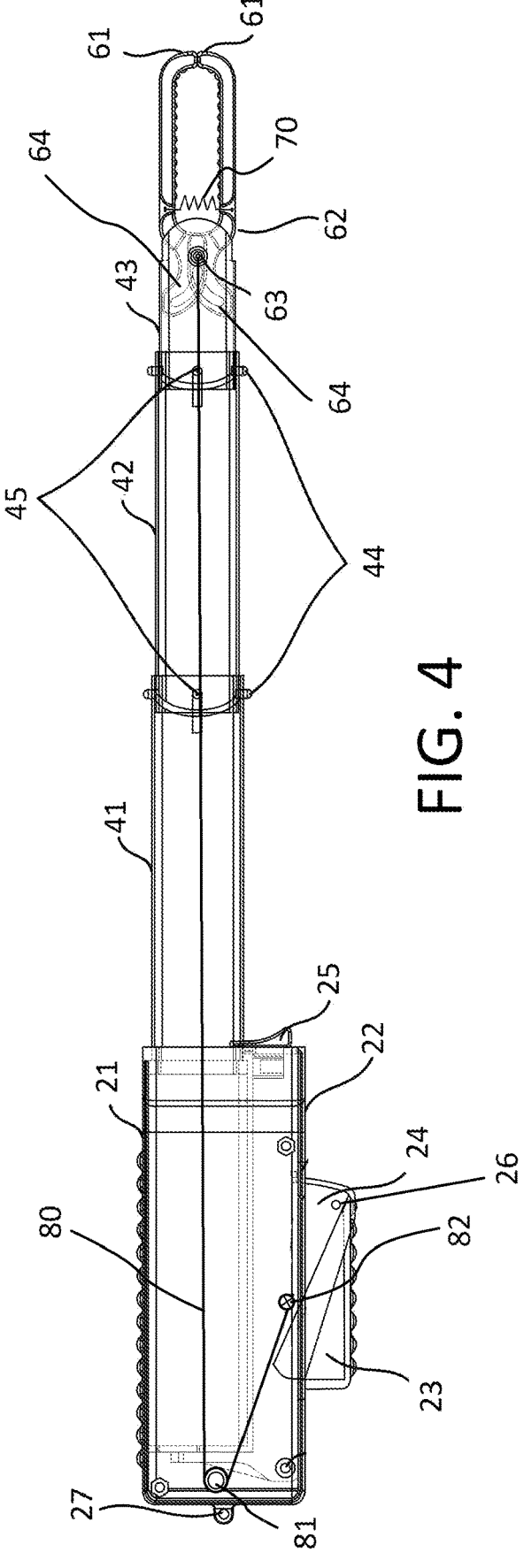
FIG. 4 is a top plan view of an exemplary embodiment of the device of the present invention in the extended state with jaws closed, showing its inner workings.
Figure 5:
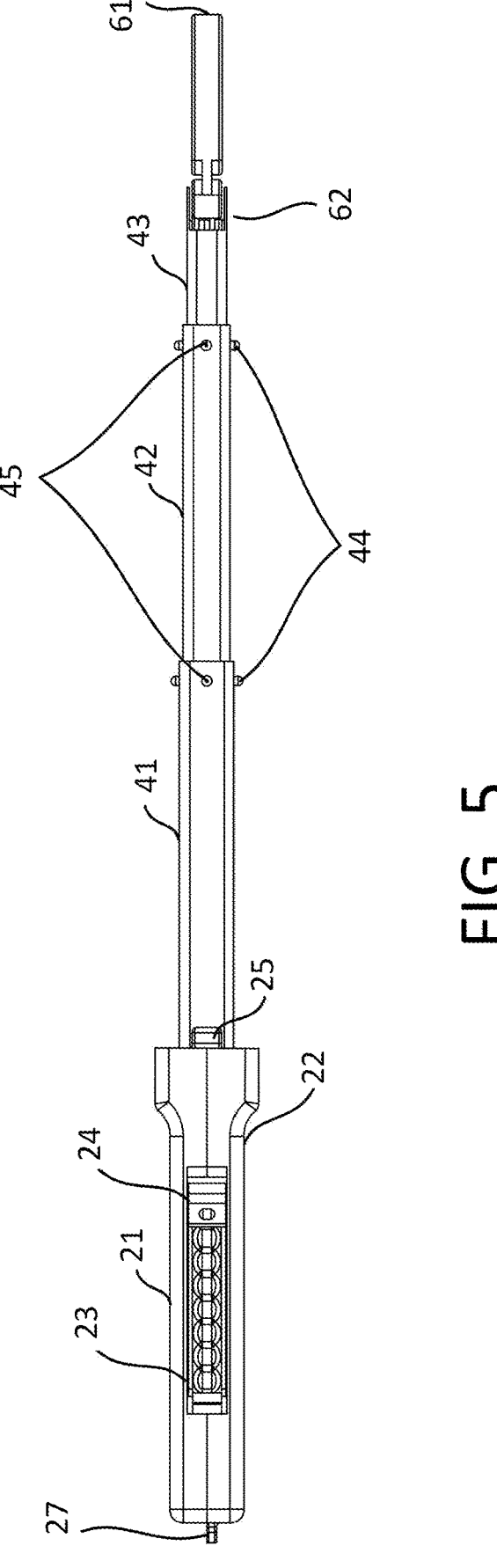
FIG. 5 is a side plan view of an exemplary embodiment of the device of the present invention in the extended state with jaws closed.
Figure 6:
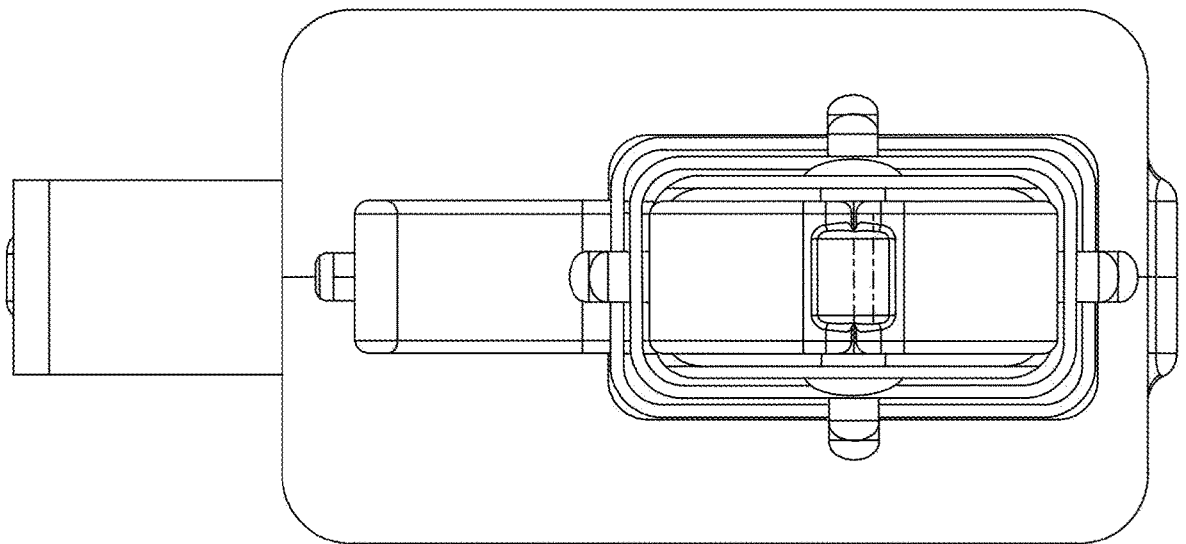
FIG. 6 is a front plan view of an exemplary embodiment of the device of the present invention in the extended state with jaws closed.
Figure 7:
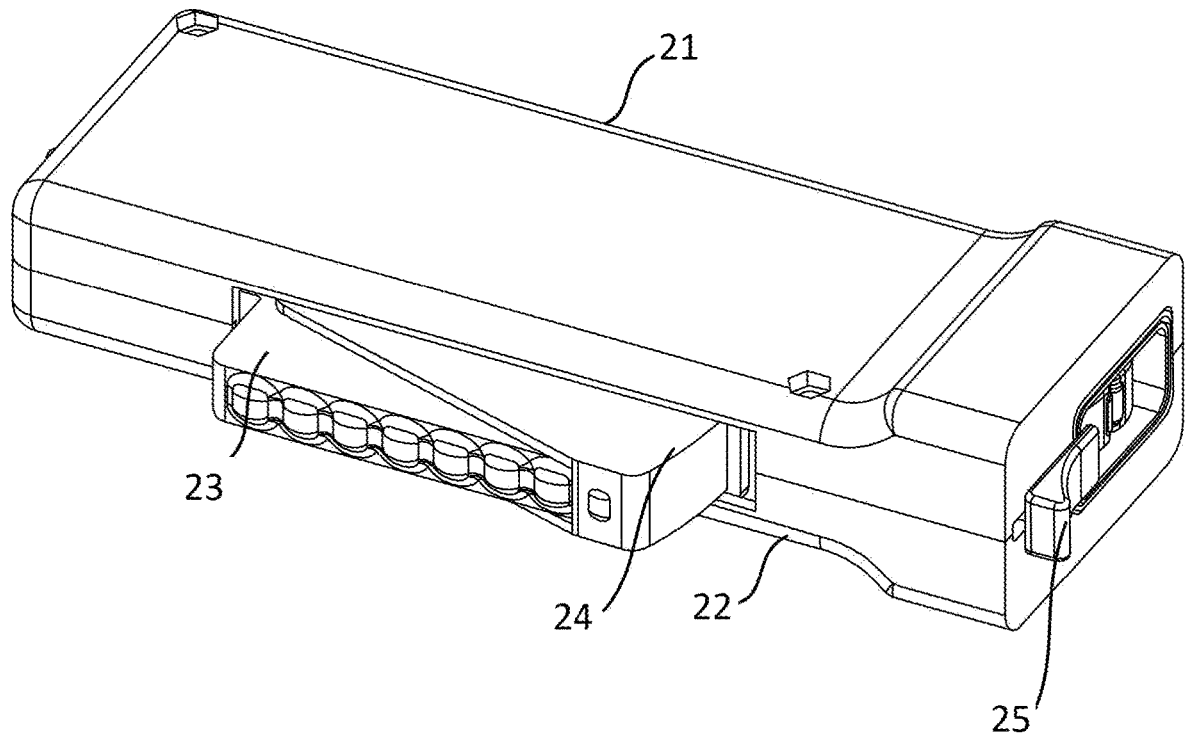
FIG. 7 is a perspective view of an exemplary embodiment of the device of the present invention in the collapsed state.
Figure 8:
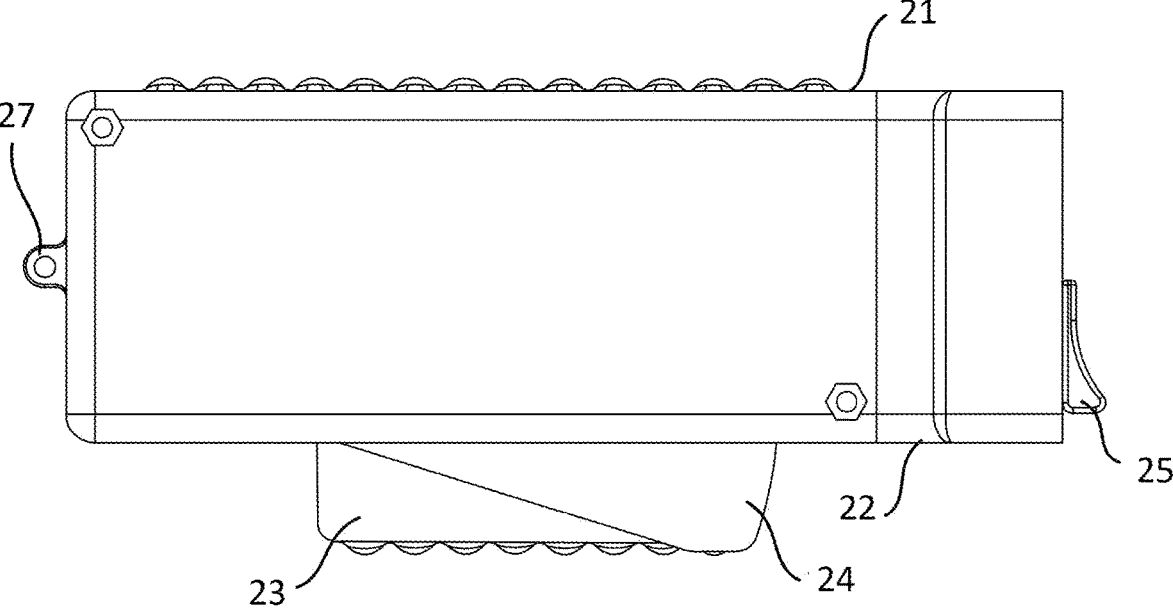
FIG. 8 is a top plan view of an exemplary embodiment of the device of the present invention in the collapsed state.
Figure 9:
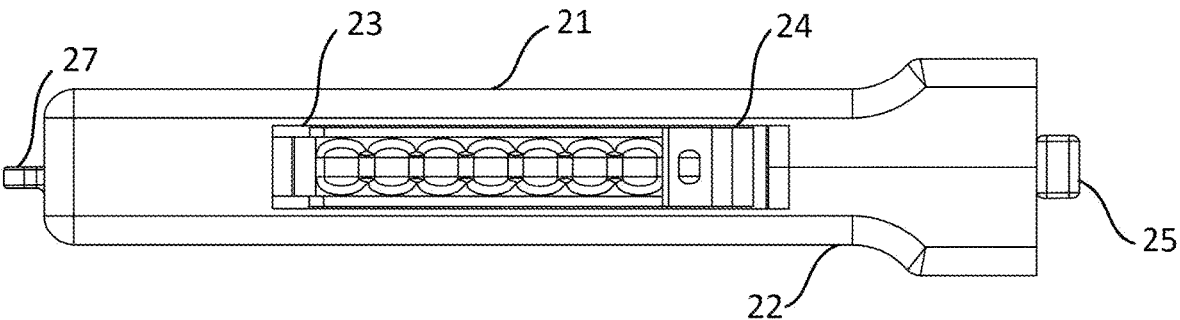
FIG. 9 is a side plan view of an exemplary embodiment of the device of the present invention in the collapsed state.
Figure 10:
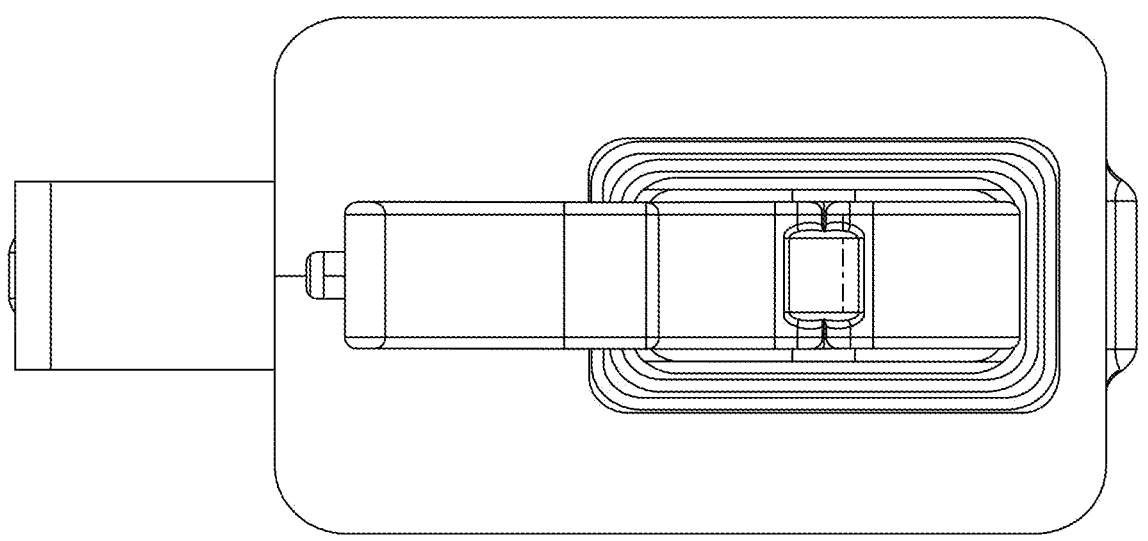
FIG. 10 is a front plan view of an exemplary embodiment of the device of the present invention in the collapsed state.

Under one embodiment, the spring is an extension spring coupling two jaws. An example is shown in FIG. 4.

Under one embodiment, the spring is a compression spring coupling two jaw levers.

Under one embodiment, the spring is an extension spring coupling two jaw levers.

Under one embodiment, the spring is a compression spring coupling a jaw to the distal pole section.

Under one embodiment, the spring is an extension spring coupling a jaw to the distal pole section.

Under one embodiment, the spring is a compression spring coupling a jaw lever to the distal pole section.

Under one embodiment, the spring is an extension spring coupling a jaw lever to the distal pole section.

Under one embodiment, the spring is a compression spring coupling a jaw lever to a jaw.

Under one embodiment, the spring is an extension spring coupling a jaw lever to a jaw.

The present invention is directed to a collapsible grabber device, comprising: a telescoping pole, a jaw assembly, a handle, a lever, a spring, and a cable coupling the jaw assembly and the lever.

The cable 80 couples a part of the jaw assembly 60 to the lever on the handle 24. When the lever is depressed, the cable is placed under tension, pulling a part of the jaw assembly partially into distal pole section. Under one embodiment, the effect of pulling a part of the jaw assembly partially into distal pole section results in the jaws opening up. Under another embodiment, the effect of pulling a part of the jaw assembly partially into distal pole section results in the jaws closing.

In FIG. 4, the cable 80 couples the jaw central pin 62 with an attachment point 82 on the handle in the close proximity to the lever. The cable is run through one or more pulleys 81 at the aft inside of the handle. The cable is taut or somewhat taut when telescoping pole is fully extended and the jaws are in the relaxed state. When the lever is depressed, the cable 80 is placed under tension, pulling a part of the jaw pivot pin through the channels in the jaw arm.

The definition of the term "cable" includes a wire, a wire cable, string, and rope.

The present invention is directed to a collapsible grabber device, comprising: a telescoping pole, a jaw assembly, a handle, a lever on handle for controlling the jaw assembly, a spring, and a cable.

The handle manufactured by the assembly of handle top side 21 to handle bottom side 22 further comprises the space for lever 23 to operate throughout its range of motion. Upon depressing the lever 23, the lever pivots around lever pivot 26, pushing against the cable thus actuating the jaws.

The use of the device of the present invention by the user is easy and intuitive.

The device of the invention is taken from its storage, such as a pocket, purse or closet. Under one embodiment, the telescoping pole lock switch 25 is depressed, the nested pole sections are pulled out of the handle. The nested telescopic pole sections 41, 42 and 43 are extended until the push buttons 44 and 45 engage with their respective holes in the proximal and medial telescopic pole sections 41 and 42 and locks in its fully extended position.

Under another embodiment, the telescopic pole sections 41, 42, and 43 are forcefully ejected from the handle upon the push of the lock switch 25 by the aid of a spring.

Under yet another embodiment, the telescopic pole sections are extended by a jerk-type motion similar to a police extendable baton.

The user then guides the grabber so that the jaws close on the item to be retrieved and squeeze on lever 23 sufficiently to grasp the item securely. The cable 80 actuates the jaws 61. The user then lifts the item and bring it to within reach with the device of the present invention.

To store the invention in its collapsed version, the user pushes the push buttons 44 and 45 the pole sections thereby releasing the pole sections and collapsing all of them pole sections into each other and into the handle. The pole sections are collapsed until lock switch 25 engages with all of the pole sections. The lock switch 25 keeps the device closed in its collapsed state until used again.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A collapsible grabber device comprising:
   a telescoping pole having a proximal end and a distal end;
   a jaw assembly at the distal end comprising two jaws movably coupled by a pivot for releasably gripping an object in a closed position;
   a handle at the proximal end configured to house the telescoping pole and the jaw assembly in a collapsed state;
   a lever disposed on the handle and configured for single-hand actuation of the jaw assembly;
   a flexible cable routed internally through the telescoping pole and operatively coupling the lever and the jaw assembly; and
   a spring disposed between the two jaws and configured to bias the jaws in a closed position such that the jaws automatically close upon release of the lever.

2. The device of claim 1, wherein each of the two jaws comprises a resilient pad for contacting items to be grabbed, the pads being in contact with each other when the jaws are in the closed position, and wherein the resilient pads are formed of a high-friction elastomeric material to enhance gripping performance.

3. The device of claim 1, wherein the spring is disposed between the two jaws.

4. The device of claim 3, wherein the spring is configured to automatically return the jaws to the closed position upon release of the lever, thereby enabling retention of an object without continuous user input.

5. The device of claim 1, wherein the telescoping pole comprises a lock switch for locking the telescoping pole in a collapsed state.

6. The device of claim 1, wherein the telescoping pole comprises a lock switch for locking the telescoping pole in an extended state.

* * * * *